(12) United States Patent
Santos et al.

(10) Patent No.: US 10,094,206 B2
(45) Date of Patent: Oct. 9, 2018

(54) HIGH TEMPERATURE MOTOR SEAL FOR ARTIFICIAL LIFT SYSTEM

(71) Applicant: Oilfield Equipment Development Center Limited, Victoria (SC)

(72) Inventors: Enrique C. Santos, Edmonton (CA); Edison R. Madamba, Edmonton (CA)

(73) Assignee: OILFIELD EQUIPMENT DEVELOPMENT CENTER LIMITED, Victoria (SC)

( * ) Notice: Subject to any disclaimer, the term of this patent is extended or adjusted under 35 U.S.C. 154(b) by 0 days.

(21) Appl. No.: 14/173,930

(22) Filed: Feb. 6, 2014

(65) Prior Publication Data

US 2014/0219825 A1 Aug. 7, 2014

Related U.S. Application Data

(60) Provisional application No. 61/761,976, filed on Feb. 7, 2013.

(51) Int. Cl.
| | |
|---|---|
| *F16J 15/48* | (2006.01) |
| *E21B 43/12* | (2006.01) |
| *F04D 13/08* | (2006.01) |
| *F04D 29/10* | (2006.01) |
| *F04B 47/06* | (2006.01) |
| *E21B 4/00* | (2006.01) |
| *F04D 13/10* | (2006.01) |
| *E21B 43/24* | (2006.01) |
| *F16J 15/52* | (2006.01) |
| *H02K 5/132* | (2006.01) |

(52) U.S. Cl.
CPC .......... *E21B 43/128* (2013.01); *E21B 4/003* (2013.01); *E21B 43/121* (2013.01); *E21B 43/2406* (2013.01); *F04B 47/06* (2013.01); *F04D 13/086* (2013.01); *F04D 13/10* (2013.01); *F04D 29/106* (2013.01); *F16J 15/52* (2013.01); *H02K 5/132* (2013.01)

(58) Field of Classification Search
CPC .... E21B 43/128; E21B 43/2406; E21B 4/003; E21B 43/121; E21B 43/38; F16J 15/52; F04D 13/10; F04D 13/06; F04D 13/086; F04D 29/061; F04D 29/106; H02K 5/132; F04B 47/06; F04B 47/08
See application file for complete search history.

(56) References Cited

U.S. PATENT DOCUMENTS

| | | | |
|---|---|---|---|
| 4,795,168 A * | 1/1989 | Adams | F16J 15/3444 277/378 |
| 4,940,911 A * | 7/1990 | Wilson | H02K 5/132 310/87 |
| 5,307,635 A | 5/1994 | Graves et al. | |
| 5,622,222 A * | 4/1997 | Wilson | E21B 41/02 166/105.4 |

(Continued)

*Primary Examiner* — Dominick L Plakkoottam
(74) *Attorney, Agent, or Firm* — Patterson + Sheridan, LLP

(57) ABSTRACT

A thermal compensator for a motor seal, includes: a guide tube for receiving a shaft of the motor seal; a metallic bag disposed around the guide tube and having an expansion profile formed in at least a portion thereof to accommodate radial and circumferential expansion of the metallic bag; a pair of flanges attached to opposite ends of the metallic bag; and a pair of adapters fastened to the respective flanges and receiving respective ends of the guide tube.

15 Claims, 9 Drawing Sheets

(56) References Cited

U.S. PATENT DOCUMENTS

| | | | |
|---|---|---|---|
| 6,242,829 B1* | 6/2001 | Scarsdale | E21B 4/003 |
| | | | 310/87 |
| 6,688,860 B2 | 2/2004 | Du et al. | |
| 7,469,748 B2 | 12/2008 | Ocalan et al. | |
| 7,520,735 B2 | 4/2009 | Merrill et al. | |
| 7,654,315 B2 | 2/2010 | Du et al. | |
| 8,221,092 B2 | 7/2012 | Chilcoat et al. | |
| 2005/0008514 A1* | 1/2005 | Merrill | F04D 13/083 |
| | | | 417/472 |
| 2005/0087343 A1* | 4/2005 | Du | E21B 4/003 |
| | | | 166/369 |
| 2006/0222529 A1 | 10/2006 | Watson et al. | |
| 2007/0045006 A1* | 3/2007 | Krueger | E21B 21/08 |
| | | | 175/25 |
| 2007/0074872 A1* | 4/2007 | Du | E21B 4/003 |
| | | | 166/369 |
| 2007/0224056 A1 | 9/2007 | Watson et al. | |
| 2008/0078560 A1 | 4/2008 | Hall | |
| 2009/0044956 A1* | 2/2009 | Nicholson | H01R 13/533 |
| | | | 166/382 |
| 2010/0202896 A1* | 8/2010 | Du | F04D 29/106 |
| | | | 417/53 |
| 2011/0274565 A1* | 11/2011 | Tetzlaff | F04B 47/06 |
| | | | 417/321 |

* cited by examiner

HIGH TEMPERATURE MOTOR SEAL FOR ARTIFICIAL LIFT SYSTEM

BACKGROUND OF THE DISCLOSURE

Field of the Disclosure

The present disclosure generally relates to a high temperature motor seal for an artificial lift system.

Description of the Related Art

Electric submersible pumping systems (ESPs) are widely used throughout the world for recovering subterranean fluids to the earth's surface. For the long term successful operation of such ESPs, the electric motor is supplied with motor oil. The motor oil not only lubricates the motor, it also cools the motor to prevent overheating. Typically, this motor oil is partially contained within a device commonly referred to as a motor seal (aka motor protector or seal section). Conventional motor seals typically include one or more elastomeric bags. These elastomeric bags serve to equalize the fluid pressure within the motor and prevent well fluids from contaminating the motor oil. Contamination of the motor oil by well fluid greatly reduces the life of the motor.

Operation of the motor heats the motor oil and as the temperature of the motor oil increases, the oil tends to expand and the pressure within the motor tends to increase. If the motor seal did not include an expandable member, such as the elastomeric motor protector bag, the internal pressure of the motor would increase dramatically. However, the motor protector bag expands and contracts to compensate for the varying liquid volume and to maintain a relatively constant pressure within the motor. Isolation between the motor oil and the well fluids and gases helps keep the motor oil clean to increase the longevity of the motor.

Elastomers are poorly suited for adverse well conditions due to low service temperature and susceptibility to infiltration by gases, such as hydrogen sulfide. One type of adverse well production is steam assisted gravity drainage (SAGD). SAGD wells are quite challenging to produce. They are known to produce at temperatures above two hundred degrees Celsius. They are typically horizontally inclined in the producing zone. The produced fluids can contain highly viscous bitumen, abrasive sand particles, high temperature water, sour or corrosive gases and steam vapor. Providing oil companies with a high volume, highly reliable form of artificial lift is greatly sought after, as these wells are quite costly to produce due to the steam injection needed to reduce the in-situ bitumen's viscosity to a pumpable level.

SUMMARY OF THE DISCLOSURE

The present disclosure generally relates to a high temperature motor seal for an artificial lift system. In one embodiment, a thermal compensator for a motor seal, includes: a guide tube for receiving a shaft of the motor seal; a metallic bag disposed around the guide tube and having an expansion profile formed in at least a portion thereof to accommodate radial and circumferential expansion of the metallic bag; a pair of flanges attached to opposite ends of the metallic bag; and a pair of adapters fastened to the respective flanges and receiving respective ends of the guide tube.

In another embodiment, a thermal compensator for a motor seal, includes: a guide tube for receiving a shaft of the motor seal; a bag mandrel disposed around the guide tube; one or more metallic bags attached to and disposed around the bag mandrel and having an expansion profile to accommodate at least one of: radial, circumferential, and tangential expansion thereof; a pair of flanges attached to opposite ends of the bag mandrel; and a pair of adapters fastened to the respective flanges and receiving respective ends of the guide tube.

In another embodiment, a method for pumping production fluid from a wellbore includes: deploying a downhole assembly of an artificial lift system into the wellbore, the downhole assembly having an electric motor, a pump, and a motor seal disposed between the motor and the pump; and operating the electric motor, thereby driving the pump and lifting production fluid from the wellbore to surface. Operation of the downhole assembly heats motor oil thereof. A metallic bag of the motor seal expands radially and circumferentially or tangentially to accommodate thermal expansion of the motor oil.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
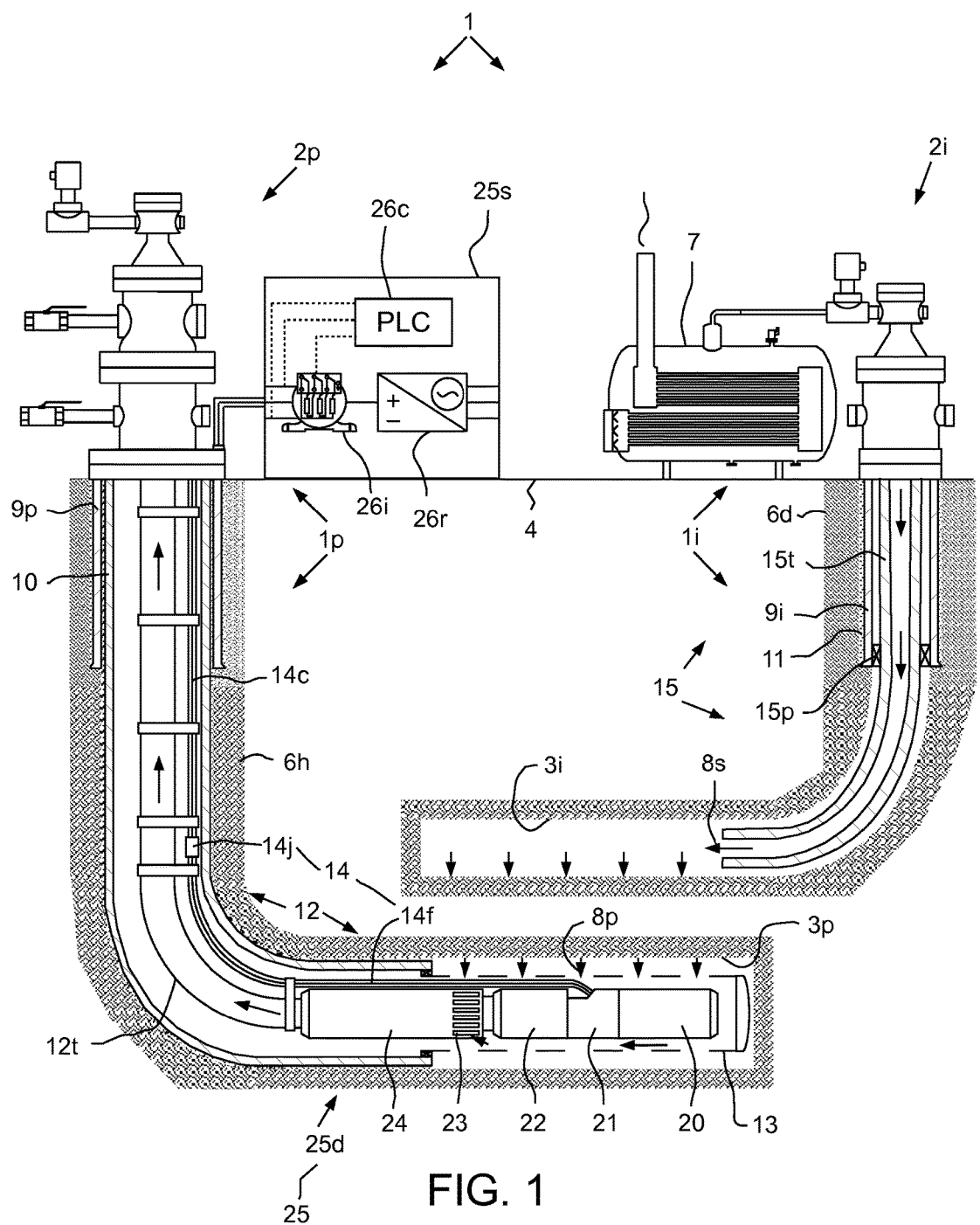
FIG. 1 illustrates an artificial lift system (ALS) pumping production fluid from a steam assisted gravity drainage (SAGD) well, according to one embodiment of the present disclosure.

FIG. 1 illustrates an artificial lift system (ALS) 25 pumping production fluid, such as bitumen 8p (aka tar sand or oil sand), from a steam assisted gravity drainage (SAGD) well 1, according to one embodiment of the present disclosure. Alternatively, the production fluid may be heavy crude oil or oil shale. The ALS 25 may include a motor driver 25s, a power cable 14, and a downhole assembly 25d. The SAGD well 1 may include an injection well 1i and a production well 1p. Each well 1i,p may include a wellhead 2i,p located adjacent to a surface 4 of the earth and a wellbore 3i,p extending from the respective wellhead. Each wellbore 3i,p may extend from the surface 4 vertically through a nonproductive formation 6d and horizontally through a hydrocarbon-bearing formation 6h (aka reservoir). Alternatively, the horizontal portions of either or both wellbores 3i,p may be other deviations besides horizontal. Alternatively, the injection well 1$i$ may be omitted and the ALS 25 may be used to pump production fluid from other types of adverse production wells, such as high temperature wells.

Surface casings 9$i,p$ may extend from respective wellheads 2$i,p$ into respective wellbores 3$i,p$ and each casing may be sealed therein with cement 11. The production well 1$p$ may further include an intermediate casing 10 extending from the production wellhead 2$p$ and into the production wellbore 3$p$ and sealed therein with cement 11. The injection well 1$i$ may further include an injection string 15 having an injection tubing string 15$t$ extending from the injection wellhead 2$i$ and into the injection wellbore 3$i$ and having a packer 15$p$ for sealing an annulus thereof.

A steam generator 7 may be connected to the injection wellhead 2$i$ and may inject steam 8$s$ into the injection wellbore 3$i$ via the injection tubing string 15$t$. The injection wellbore 3$i$ may deliver the steam 8$s$ into the reservoir 6$h$ to heat the bitumen 8$p$ into a flowing condition as the added heat added reduces viscosity thereof. The horizontal portion of the production wellbore 3$p$ may be located below the horizontal portion of the injection wellbore 3$i$ to receive the bitumen drainage 8$p$ from the reservoir 6$h$.

A production string 12 may extend from the production wellhead 2$p$ and into the production wellbore 3$p$. The production string 12 may include a string of production tubing 12$t$ and the downhole assembly 25$d$ connected to a bottom of the production tubing. A slotted liner 13 may be hung from a bottom of the intermediate casing 10 and extend into an open hole portion of the production wellbore 3$p$. The downhole assembly 25$d$ may extend into the slotted liner 13. Alternatively, the downhole assembly 25$d$ may extend to a bottom of the intermediate casing 10 or be disposed in the vertical portion of the production wellbore 3$p$.

The downhole assembly 25$d$ may include a submersible electric motor 20, a motor head 21, a motor seal 22, and a pump 24. Housings of the components may be connected and sealed, such as by flanged connections. The flanged connections may longitudinally and torsionally connect the component housings. Shafts of the components may be torsionally connected, such as by shaft couplings. The shaft couplings may be splined couplings. The shaft couplings may also transfer thrust loading from the pump 24 to the motor seal 22.

The pump 24 may be centrifugal, such as a radial flow or mixed axial/radial flow centrifugal pump. The pump 24 may include one or more stages. Each stage may include an impeller and a diffuser. Each impeller may be longitudinally and torsionally connected to the pump shaft and each diffuser may be longitudinally and torsionally connected to the pump housing. Rotation of each impeller by the pump shaft may impart velocity to the bitumen 8$p$ and flow through the stationary diffuser may convert a portion of the velocity into pressure. The pump 24 may deliver the bitumen 8$p$ to the production tubing 12$t$ via a discharge head. Alternatively, the pump 24 may be a positive displacement pump, such as a gear pump, vane pump, or progressive cavity pump.

An inlet 23 of the pump 24 may include a plurality of ports formed through the pump housing for allowing bitumen 8$p$ to enter a lower or first stage of the pump and a screen to filter particulates from the production fluid. Alternatively, the inlet 23 may be a separate component, such as a bottom feeder having a housing and ported mandrel rotatable relative thereto and eccentrically weighted such that the mandrel ports orient in response to gravity to face a bottom side of the horizontal portion of the production wellbore 3$p$. Alternatively, the inlet 23 may be a separate component, such as a static gas separator or rotary gas separator depending on the gas content of the bitumen 8$p$.

Figure 3A:
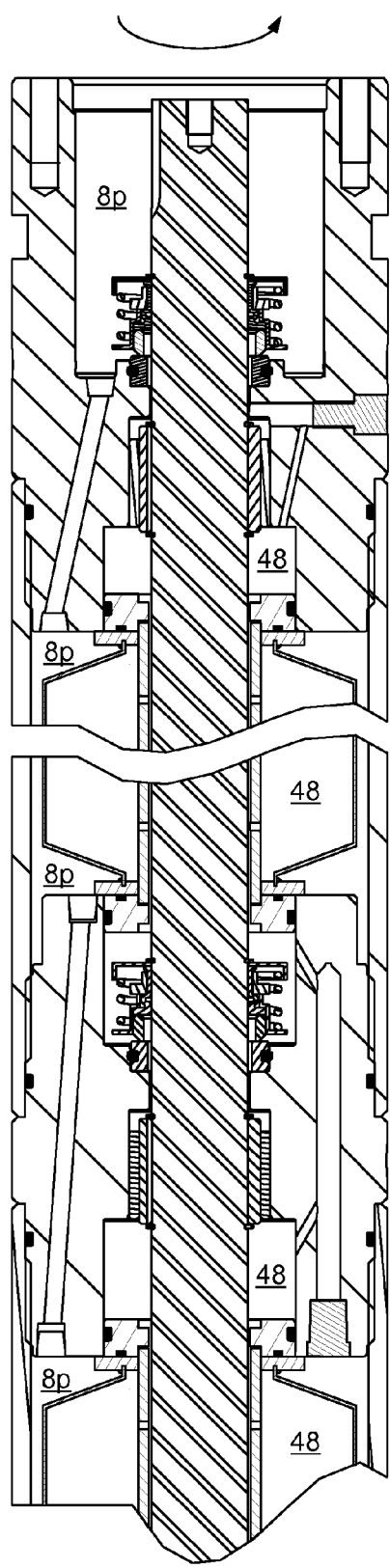
FIGS. 3A and 3B illustrate the motor seal in an operating condition.
Figure 3B:
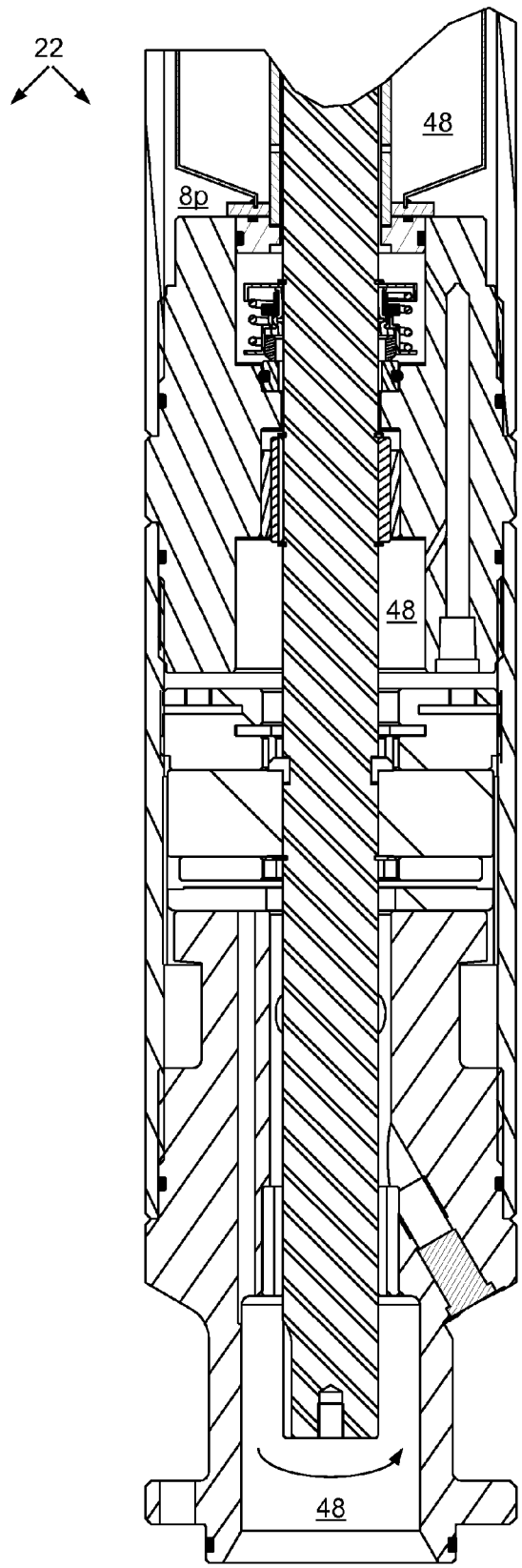

The motor 20 may be an induction motor or a permanent magnet motor, such as a brushless DC motor (BLDC). The motor 20 may be filled with a dielectric, thermally conductive liquid lubricant, such as motor oil 48 (FIGS. 3A and 3B). The motor oil 48 may have a density less than the bitumen 8$p$. In operation, the motor 20 may rotate the motor shaft, thereby driving the pump shaft. The induction motor may be a two-pole, three-phase, squirrel-cage type and have a wound rotor and stator. The BLDC motor may be two pole and three phase. The BLDC motor may include a stator having the three phase winding and a permanent magnet rotor. The permanent magnet rotor may be made of one or more rare earth, ceramic, or ceramic-metal composite (aka cermet) magnets.

The motor driver 25$s$ may provide power and control to the motor 20. A surface cable may connect from the motor driver 25$s$ to the production wellhead 2$p$. The surface cable may connect to a penetrator at the wellhead 2$p$. The penetrator may connect the surface cable to a downhole cable 14$c$. The downhole cable 14$c$ may extend down a length of the production tubing 12$t$ and may be fastened to the production tubing 12$t$ at various intervals. The downhole cable 14$c$ may terminate at a splice 14$j$ located adjacent a bottom of the vertical portion of the production wellbore 3$p$. Alternatively, the splice 14$j$ may be located adjacent the downhole assembly 25$d$. The splice 14$j$ may connect the downhole cable 14$c$ to a motor lead extension (MLE) cable 14$f$. The MLE cable 14$f$ may be flat to fit in an annulus formed between the pump 24 and the casing 10 and/or liner 13. The MLE cable 14$f$ may terminate at a pothead of the motor head 21. The pothead may connect the MLE cable 14$f$ to internal leads (not shown) connected to stator windings of the motor 20. Each cable 14$c,f$ may include a conductor for each phase of the motor (i.e., three), an insulating jacket for each conductor, a fluid barrier, a buffer, and armor.

Alternatively, the downhole assembly 25$d$ may include a second (or more) motor stacked in tandem with the motor 20 and/or the motor 20 may include one (or more) additional stages.

The motor driver 25$s$ may include a rectifier 26$r$, an inverter 26$i$, a programmable logic controller (PLC) 26$c$, and one or more sensors (not shown), such as a voltmeter and one or more ammeters. The motor driver 25$s$ may receive a three phase alternating current (AC) power signal from a utility grid or generator (not shown). The rectifier 26$r$ may convert the three phase AC power signal to a direct current (DC) power signal and supply the converted DC power signal to the inverter 26$i$. For the induction motor, the inverter 26$i$ may output a three phase sinusoidal power signal at a variable frequency to control the speed of the motor 20.

For the BLDC motor, the inverter 26$i$ may have an output for each phase (i.e., three) of the motor 20 and may modulate the DC power signal to drive each phase of the stator 10$s$ based on control signals from the PLC. The sensors may measure voltage and current of one or more of the inverter outputs and be in data communication with the PLC 26$c$. For the BLDC motor, the PLC 26$c$ may execute a program for commissioning the motor 20 to obtain necessary parameters for model-based back electromotive force (BEMF) control of the motor. The PLC 26$c$ may utilize data from the commissioning program to execute a BEMF model of the motor 20 for estimating a position of the rotor. The PLC 26$c$ may use the estimated rotor position to control the inverter 26i such that the frequency of the power signals supplied to the stator windings match the frequency of the rotation of the magnetic field in the rotor. The PLC 26c may iteratively repeat the estimating and control in real time.

Alternatively, the motor driver 25s and the motor head 31 may each include a transformer (not shown). The motor driver transformer may increase voltage of the modulated power signals for transport along the cables 14c,f and the motor head transformer may reduce the voltage for delivery to the stator 10s.

Alternatively, a production packer (not shown) may be set between the production tubing 12t or downhole assembly 25d and the intermediate casing 10.

Figures 2A, 2B:
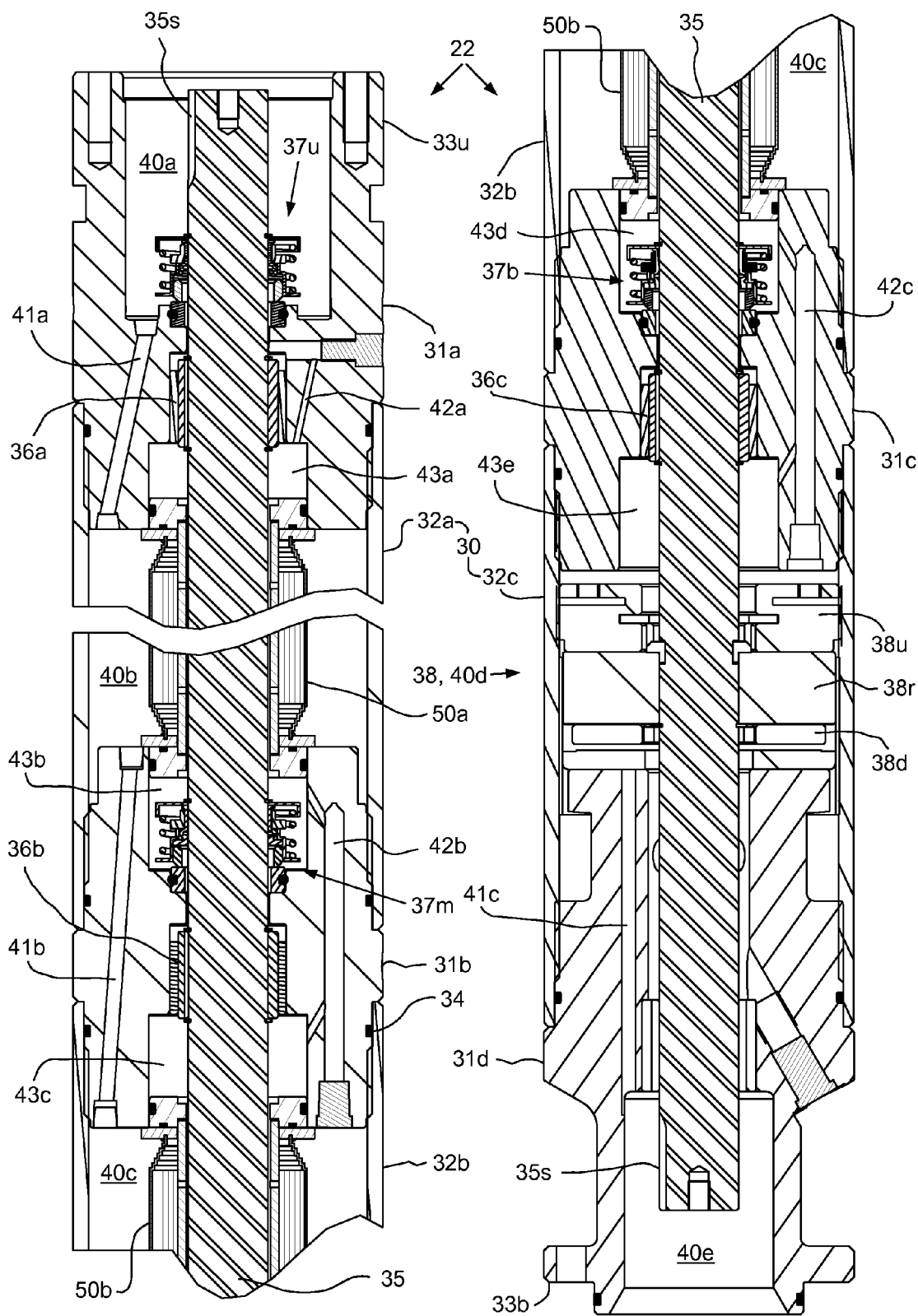
FIGS. 2A and 2B illustrate a motor seal of the ALS in a deployment condition.

FIGS. 2A and 2B illustrate the motor seal 22 in a deployment condition. The motor seal 22 may include a tubular housing 30 and a shaft 35 disposed in the housing and rotatable relative thereto. To facilitate assembly, the housing 30 may include one or more sections 31a-d, 32a-c, each section longitudinally and torsionally connected, such as by a threaded connection and sealed, such as by as a seal ring 34. The seal rings 34 may be metallic or made from a high temperature polymer. Each housing section 31a-d, 32a-c may further be torsionally locked, such as by a tack weld (not shown). The housing sections 31a-d may be bulkheads and the housing sections 32a-c may be tubes. The bulkheads 31a-d may partition a bore of the housing 30 into chambers 40a-e. The bulkheads 31a-d may also have cavities 43a-e formed therein. The bulkheads 31a-d may have chamber passages 41a-c formed therethrough for providing fluid communication between the chambers 40a-e and cavity passages 42a-c for providing fluid communication between the cavities 43a-e (or between a cavity and a gland).

The upper bulkhead 31a may have a flange 33u formed at a top thereof for connection to the pump 24 and the lower bulkhead 31d may have a flange 33b formed at a bottom thereof for connection to the motor head 21. The lower flange 33b may have holes formed therethrough for receiving threaded fasteners, such as bolts (not shown) and a nose. The nose may have a groove formed in an outer surface thereof for carrying a seal ring 34. The upper flange 33u may have threaded sockets formed therein for receiving shafts of the bolts (of a lower flange of the pump 24) and a seal face. The seal face may receive the lower pump flange nose and seal, thereby sealing the connection.

The shaft 35 may include a solid core portion and upper and lower splines 35s formed at and spaced around respective ends of the core portion. Alternatively, the shaft 35 may be hollow. The shaft splines 35s may each mate with respective upper and lower splined couplings (not shown) for torsional connection of the shaft 35 to the pump shaft and to the motor head shaft. The upper splined coupling may also transfer thrust load from the pump shaft to the shaft 35. The shaft 35 may be supported for rotation relative to the housing 30 by one or more radial bearings 36a-c. Each radial bearing 36a-c may include an inner sleeve and an outer sleeve. The sleeves may be made from a wear-resistant material, such as a tool steel, ceramic, or cermet. Each inner sleeve may be longitudinally connected to the shaft 35, such as by retainers (i.e., snap rings) engaged with respective grooves formed in an outer surface of the shaft core, and torsionally connected to the shaft, such as by press fit or key and keyway. Each outer sleeve may be longitudinally and torsionally connected to a respective bulkhead 31a-c, such as by a press fit. Each inner sleeve may have one or more lubricant grooves formed along an inner surface thereof.

An interface between the shaft 35 and the housing 30 may be sealed by one or more rotating mechanical seals 37u,m,b.

Each mechanical seal 37u,m,b may include a rotor and a stator. The rotor may include a shell, a shaft seal, a retainer, a seal spring, a spring stop, and a face seal. The shaft seal may be metallic or made from a high temperature polymer and may seal against an outer surface of the shaft 30, an inner surfaces of the shell and retainer, and a back surface of the rotor face seal. The retainer may be pressed onto an outer surface of the shaft seal and may press the shaft seal against the shaft 30, thereby torsionally connecting the rotor to the shaft. The shell may house a lower portion of the shaft seal and the rotor face seal and the rotor face seal may be pressed into the shell. The shell may have a lip for receiving a lower end of the seal spring. The stop may receive an upper end of the seal spring and be longitudinally connected to the shaft 35, such as by retainer (i.e., snap ring) engaged with a respective groove formed in an outer surface of the shaft core, and torsionally connected to the shaft, such as by press fit or key and keyway. The shell may shoulder against a lower end of the shaft seal which may shoulder against the rotor face seal. The spring may push the shell and thus the rotor face seal against a face seal of the stator.

The stator may include the face seal, a gland, and a gland seal. Each gland may be formed in a respective bulkhead 31a,c. The stator face seal may be torsionally connected to the gland by seal friction and/or press fit and longitudinally connected thereto by shouldering of a back face of the stator seal against the gland. Each face seal may be made from one of the radial bearing materials to withstand the relative rotation therebetween. An annular lubricant channel may be formed between an inner surface of each face seal and the shaft 30.

To support thrust load from the pump 24, the motor seal 22 may further include a thrust bearing 38. The thrust bearing 38 may be housed in a thrust chamber 40d. The thrust bearing 38 may include a thrust section 32c of the housing 30, a thrust runner 38r, an up-thrust carrier 38u, and a down-thrust carrier 38d. The thrust runner 38r may be longitudinally connected to the shaft 35, such as by retainers (i.e., snap rings) engaged with respective grooves formed in an outer surface of the shaft core, and torsionally connected to the shaft, such as by key and keyway (not shown). The thrust runner 38r may also form a sliding fit with the thrust section 32c for radial support therefrom. Each carrier 38u,d and the thrust runner 38r may be made from one of the radial bearing materials to withstand the relative rotation therebetween. The thrust section 32c may have two or more lubricant grooves formed along an inner surface thereof. The thrust runner 38r may include two or more lubricant grooves formed along an outer surface thereof. The thrust carriers 38u,d may each be longitudinally and torsionally connected to the thrust section 32c, such as by press fit. An annular lubricant channel may be formed between an inner surface of each carrier 38u,d and the shaft 30. Each carrier 38u,d may have two or more load pads formed in a face thereof adjacent the thrust runner 38r. A radial lubricant channel may be formed between the pads.

Figures 4A, 4B:
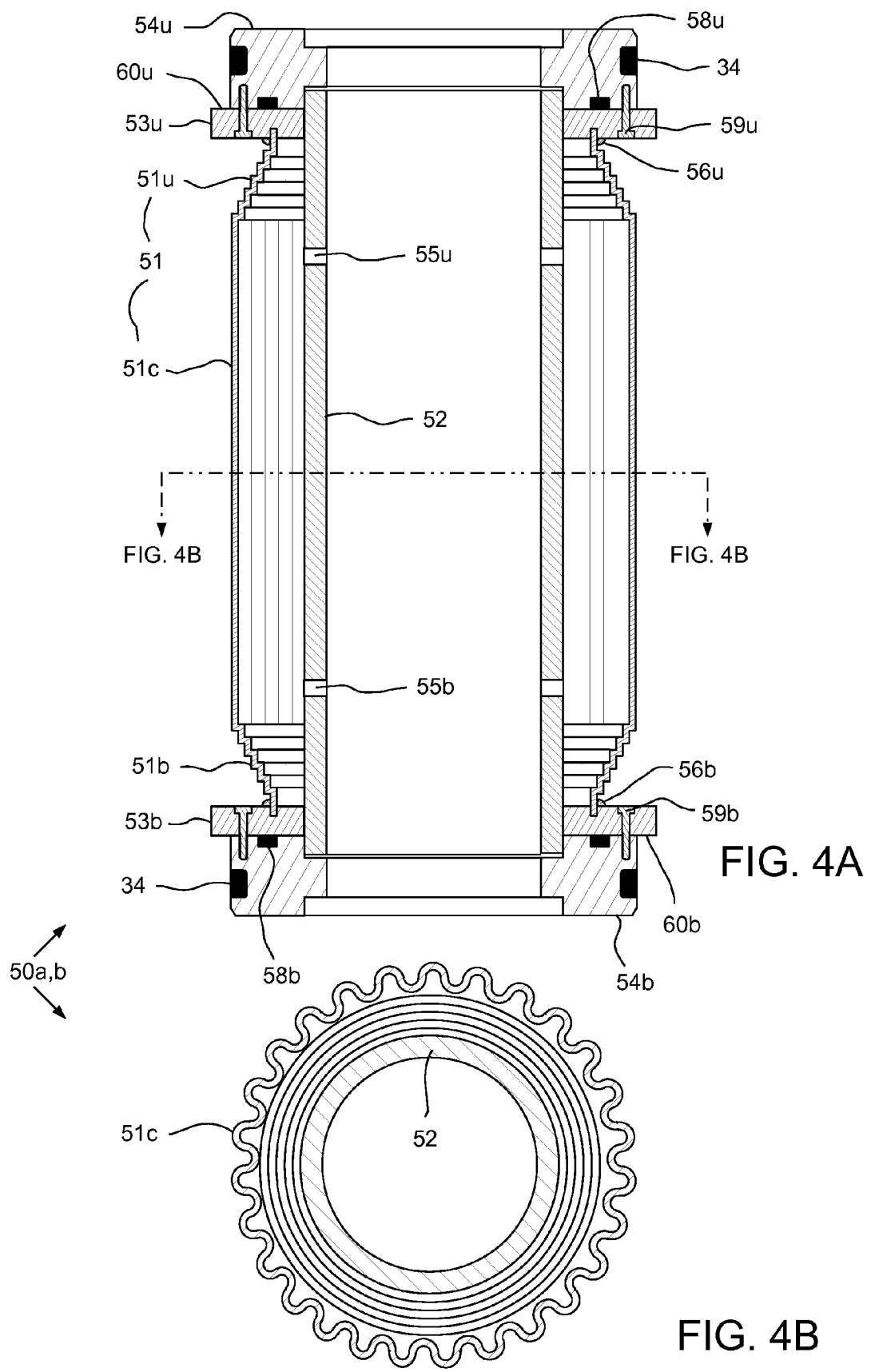
FIGS. 4A and 4B illustrate a thermal compensator of the motor seal.

FIGS. 4A and 4B illustrate a thermal compensator 50a,b of the motor seal 22. To accommodate thermal expansion of the motor oil 48 while isolating the motor oil from pumped bitumen 8p, the motor seal 22 may include one or more thermal compensators 50a,b. Each thermal compensator 50a,b may be disposed in a respective compensation chamber 40b,c and may divide the respective chamber into an outer portion and an inner portion. Each thermal compensator 50a,b may include a metallic bag 51, a guide tube 52, upper 53u and lower 53b flanges, and upper 54u and lower 54b adapters. The guide tube 52 may be disposed in a bore of the bag 51 and extend through the bag bore and bores of the flanges 53u,b. Each end of the guide tube 52 may be received by a respective recess formed in each adapter 53u,b. Each end of the bag 51 may be attached to a respective flange 53u,b, such as by a weld 56u,b. Each adapter 54u,b may be fastened to a respective flange 53u,b at a side opposite to the bag 51, such as by one or more respective bolts 59u,b or screws. An interface between each adapter 54u,b and flange 53u,b may be sealed by a respective gasket 58u,b. The gaskets 58u,b may each be metallic or made from a high temperature polymer. Each flange 53u,b may have an outer diameter greater than the respective adapter 54u,b to form a respective shoulder 60u,b. Each adapter 54u,b may also have a groove formed in an outer surface thereof for carrying one of the seal rings 34.

Each adapter 54u,b may be received in a respective cavity 43a-d and each compensator 50a,b may be longitudinally connected to the housing by entrapment of the shoulders 60u,b between respective ends of adjacent bulkheads 31a-c. An annular lubricant channel may be formed between an inner surface of each compensator 50a,b and an outer surface of the shaft 35. The inner portion of each chamber 40b,c may be formed between an inner surface of the respective bag 51 and an outer surface of the respective guide tube 52. The inner portion of each chamber 40b,c may be in fluid communication with the respective lubricant channel by one or more sets 55u,b of one or more ports formed through the respective guide tube 52. Alternatively, each end of the guide tube 52 may be notched to provide the lubricant communication.

The bag 51 may be made from a malleable, ductile, and/or resilient metal or alloy, such as aluminum, copper, tin, lead, brass, bronze, low carbon steel, high strength low alloy steel, stainless steel, gold, silver, titanium, nickel, or alloys based on the metals thereof. The bag 51 may be seamless or have a longitudinal seam weld (not shown). The bag 51 may have a thin wall thickness such that the bag is pliable to radially and circumferentially expand in response to lubricant pressure in the inner portion of the respective chamber being greater than bitumen pressure in the outer portion of the respective chamber and radially contract in response to the bitumen pressure being greater than the lubricant pressure. The thin bag wall thickness may be less or substantially less than plate thickness (one-quarter inch) and may be equal to a thickness of sheet metal (six thousandths of an inch to twenty-four hundredths of an inch), foil (one to five thousandths of an inch), or leaf (less than one thousandth of an inch).

Figure 5A:
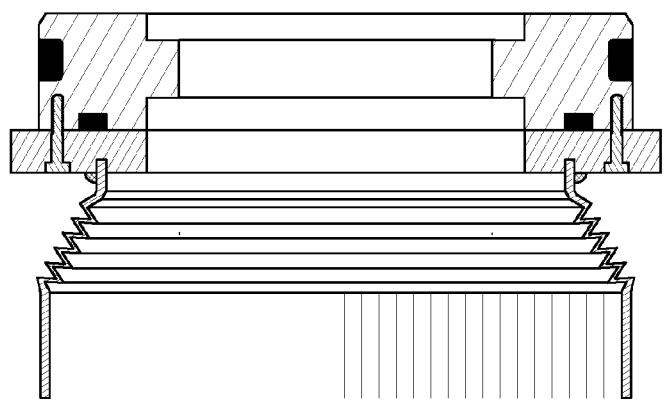
FIGS. 5A-5C illustrate alternative thermal compensators.
Figure 5B:
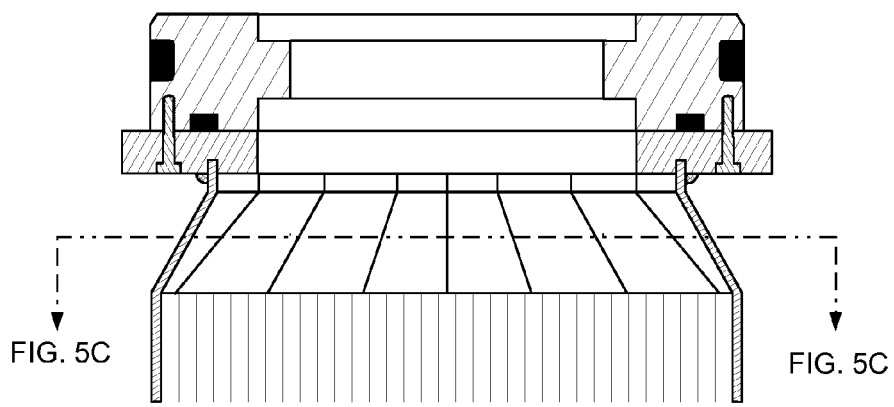
Figure 5C:
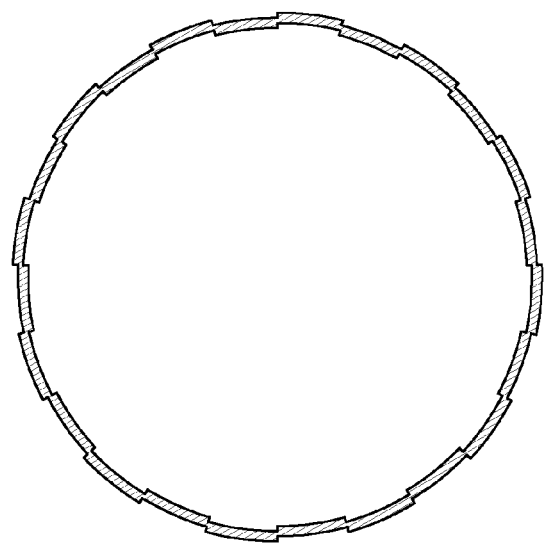

Each bag 51 may have a cylindrical mid-portion 51c and conical end portions 51u,b. To accommodate expansion and contraction of the bag 51, a wall of the bag may form an expansion profile. The end portions 51u,b may have a different expansion profile from the cylindrical portion 51c, such as the end portions having a stepped expansion profile formed there-along and the cylindrical portion having a convoluted (aka bellows) expansion profile formed there-around. Alternatively, the end portions may have an expansion profile corresponding to the expansion profile of the cylindrical portion. Alternatively, the end portions 51u,b may have a corrugated expansion profile (FIG. 5A), a pleated expansion profile (FIGS. 5B and 5C), or a convoluted expansion profile (formed there-around or there-along). Alternatively, the cylindrical portion 51c may have a corrugated expansion profile (not shown), a convoluted bellows profile formed there-along (FIG. 9A), or a pleated expansion profile (not shown).

FIGS. 3A and 3B illustrate the motor seal 22 in an operating condition. Motor oil 48 may be added to the motor 20, motor head 21, the inner portion of the motor seal chambers 40b,c, the thrust chamber 40d, and cavities 43a-e via a fill and vent port before deployment of the downhole assembly 25d into the wellbore. Motor oil 48 may or may not be added to the outer portion of the motor seal chambers 40a-c for startup. Once the downhole assembly 25d reaches deployment depth, the motor driver 25s may supply the motor 20 with the modulated power signals via the power cable 14 to torsionally drive the rotor. The rotor may in turn torsionally drive the pump shaft. The pump 24 may draw the heated bitumen 8p from the slotted liner 13, along the motor 20, motor head 21, and motor seal 22, and into the inlet 23. The pump 24 may then discharge the bitumen 8p into the production tubing 12t. The production tubing 12t may then transport the bitumen 8p to the production wellhead 2p.

As the bitumen 8p is being pumped, the bitumen may infiltrate the outer portion of the motor seal chambers 40a-c and heat the motor oil 48. The motor oil 48 may then thermally expand in response to heating by the bitumen 8p. The thermal compensators 50a,b may isolate the bitumen 8p being pumped through the pump 24 from the motor oil 48. The bags 50a,b may expand to accommodate the thermal expansion of the motor oil 48, thereby equalizing the lubricant pressure with the intake pressure of the bitumen 8p. The bags 51 may have sufficient stiffness to impart a slight positive pressure to the motor oil 48 relative to the intake pressure, thereby ensuring that any leakage through the rotating seals 37u,m,b is motor oil leaking out and not bitumen 8p leaking in. The bags 51 may fully expand (shown) or may be oversized such that the expansion profiles do not fully unfold before the bags contact the housing 30 (not shown).

Figure 6A:
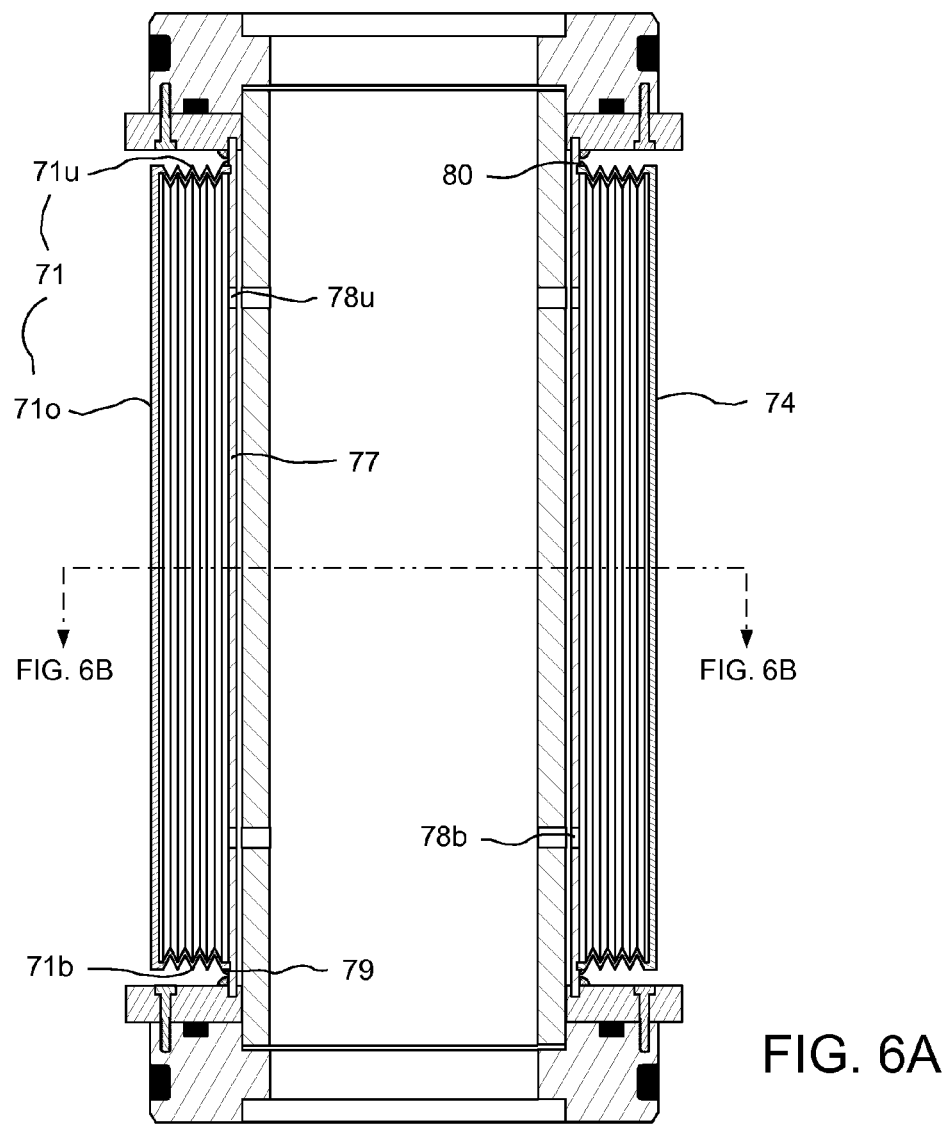
FIGS. 6A and 6B illustrate another alternative thermal compensator.
Figure 6B:
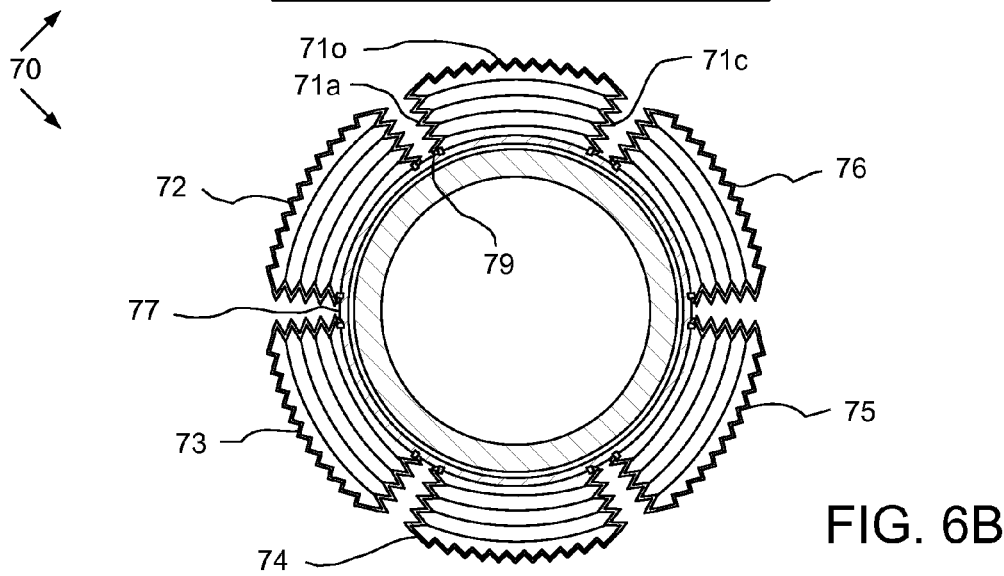

FIGS. 6A and 6B illustrate another alternative thermal compensator 70. First and second thermal compensators 70 (only one shown) may replace the respective compensators 50a,b in the motor seal 22. The thermal compensator 70 may include a plurality of metallic bags 71-76, a bag mandrel 77, the guide tube 52, the upper 53u and lower 53b flanges, and the upper 54u and lower 54b adapters. Each end of the bag mandrel 77 may be attached to a respective flange 53u,b, such as by the weld 56u,b. The bag mandrel 77 may have one or more sets 78u,b of ports formed through a wall thereof for lubricant communication, each set having a port in communication with a respective bag 71-76. The bag mandrel 77 may be cylindrical (shown).

Each bag 71-76 may have the thickness, be made from one of the metal or alloys, and have one of the expansion profiles discussed above for the bag 51. Each bag 71-76 may be attached to the bag mandrel 77, such as by a respective weld 79, 80. Each bag 71-76 may be a cylindrical segment having an outer wall 71o, side walls 71a,c, and upper 71u and lower 71b walls. The bag mandrel 77 may serve as the inner wall for each bag 71-76. Each wall 71a-c,o,u may have the expansion profile to accommodate radial and circumferential expansion and contraction of the bags 71-76. The bags 71-76 may be spaced around the bag mandrel 77 with a gap formed between adjacent bags to accommodate the expansion and contraction.

Figure 7A:
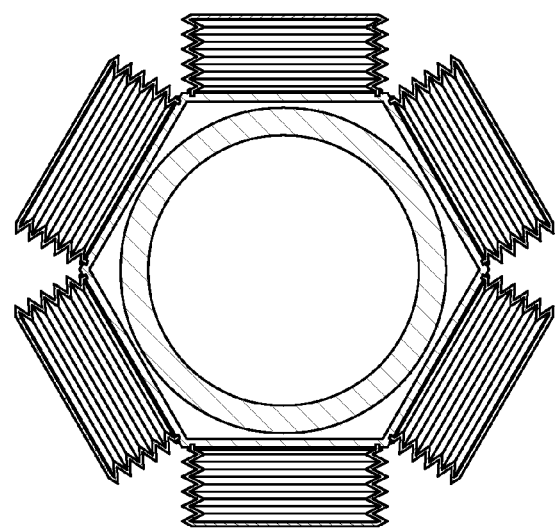
FIGS. 7A and 7B illustrate more alternative thermal compensators.
Figure 7B:
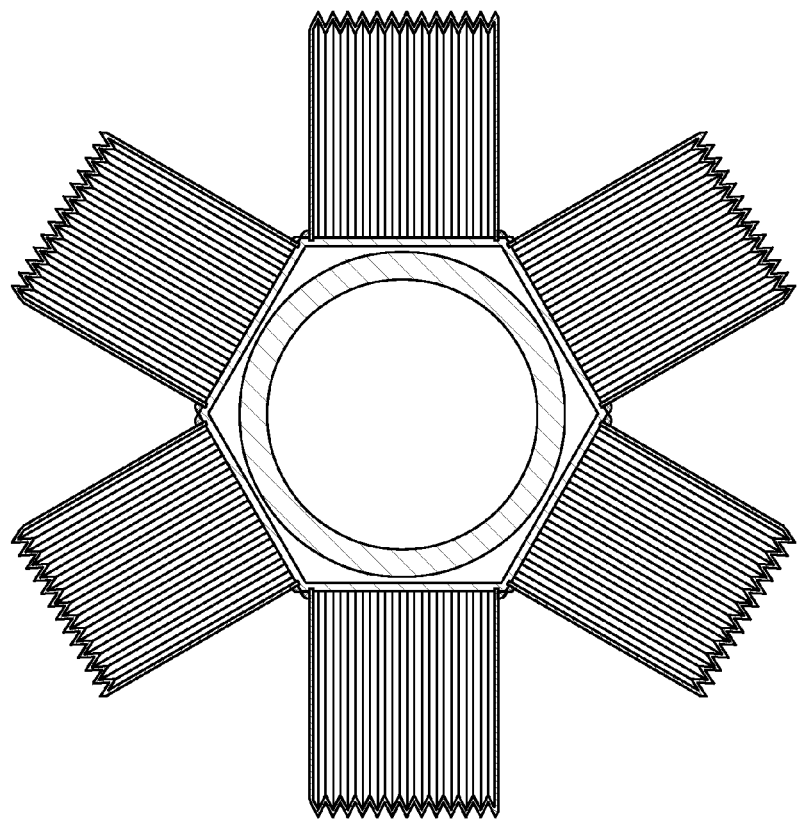

Alternatively, the bag mandrel 77 may be polygonal having a side for each bag (not shown, see FIGS. 7A and 7B) and each bag 71-76 may be box shaped (not shown, see FIGS. 7A and 7B) and have the expansion profiles for radial and tangential expansion thereof. Further, for the polygonal/box alternative of FIG. 7A, each bag may have an expansion profile formed only on the side, upper, and lower walls (non-profiled outer wall) for radial expansion only. Further, for the polygonal/box alternative of FIG. 7B, each bag may have an expansion profile formed only on the outer, upper and lower walls (non-profiled side walls) for tangential expansion only.

Figures 8A, 8B:
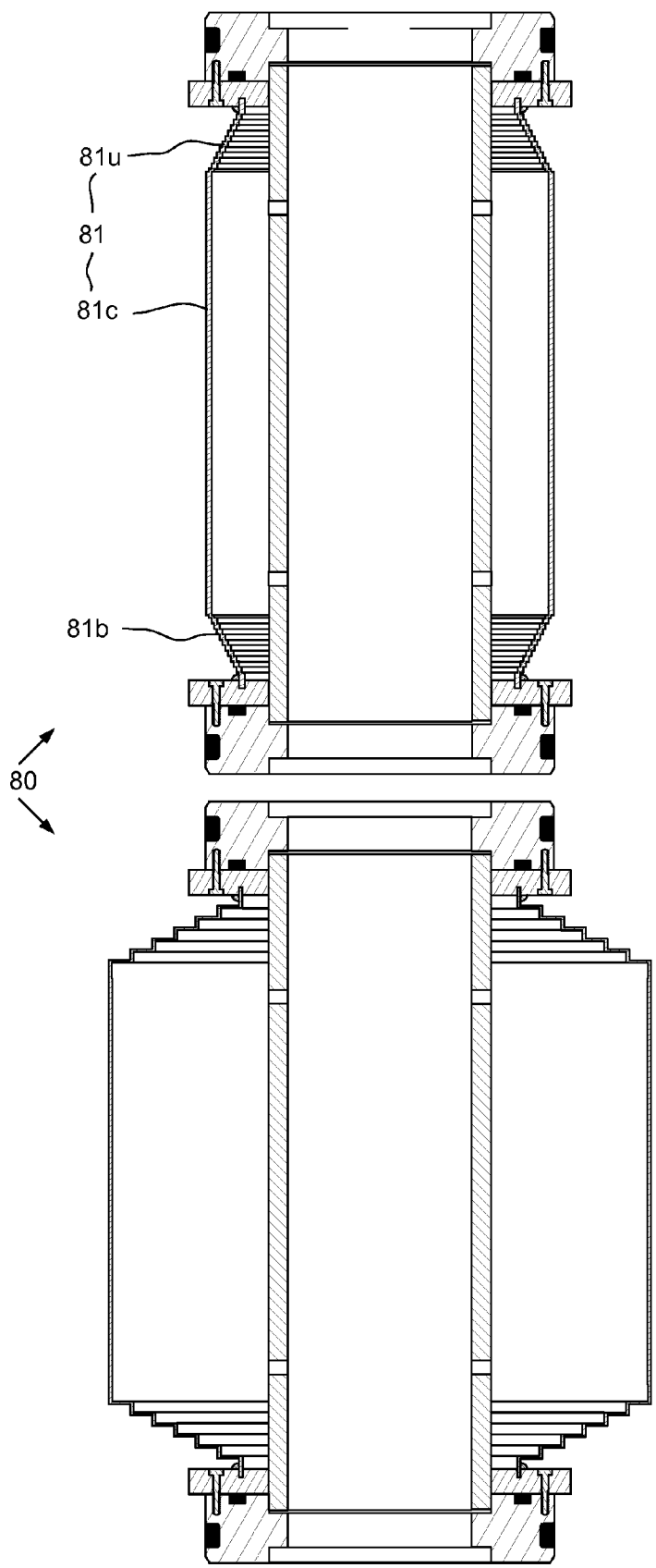
FIG. 8A illustrates another alternative thermal compensator in a contracted position.
FIG. 8B illustrates the thermal compensator in the expanded position.

FIG. 8A illustrates another alternative thermal compensator 80 in a contracted (deployment) position. FIG. 8B illustrates the thermal compensator 80 in the expanded position. First and second thermal compensators 80 (only one shown) may replace the respective compensators 50a,b in the motor seal 22. The thermal compensator 80 may include a metallic bag 81, the guide tube 52, the upper 53u and lower 53b flanges, and the upper 54u and lower 54b adapters. The bag 81 may have the thickness and be made from one of the metal or alloys discussed above for the bag 51. Each bag 81 may have a cylindrical mid-portion 81c and conical end portions 81u,b. To accommodate expansion and contraction of the bag 81, any of the expansion profiles may be formed in the end portions 81u,b (stepped profile shown). The mid-portion 81c may instead deform plastically and/or elastically to accommodate the expansion and contraction, thereby obviating the need to have a profile formed therein.

Figures 9A, 9B:
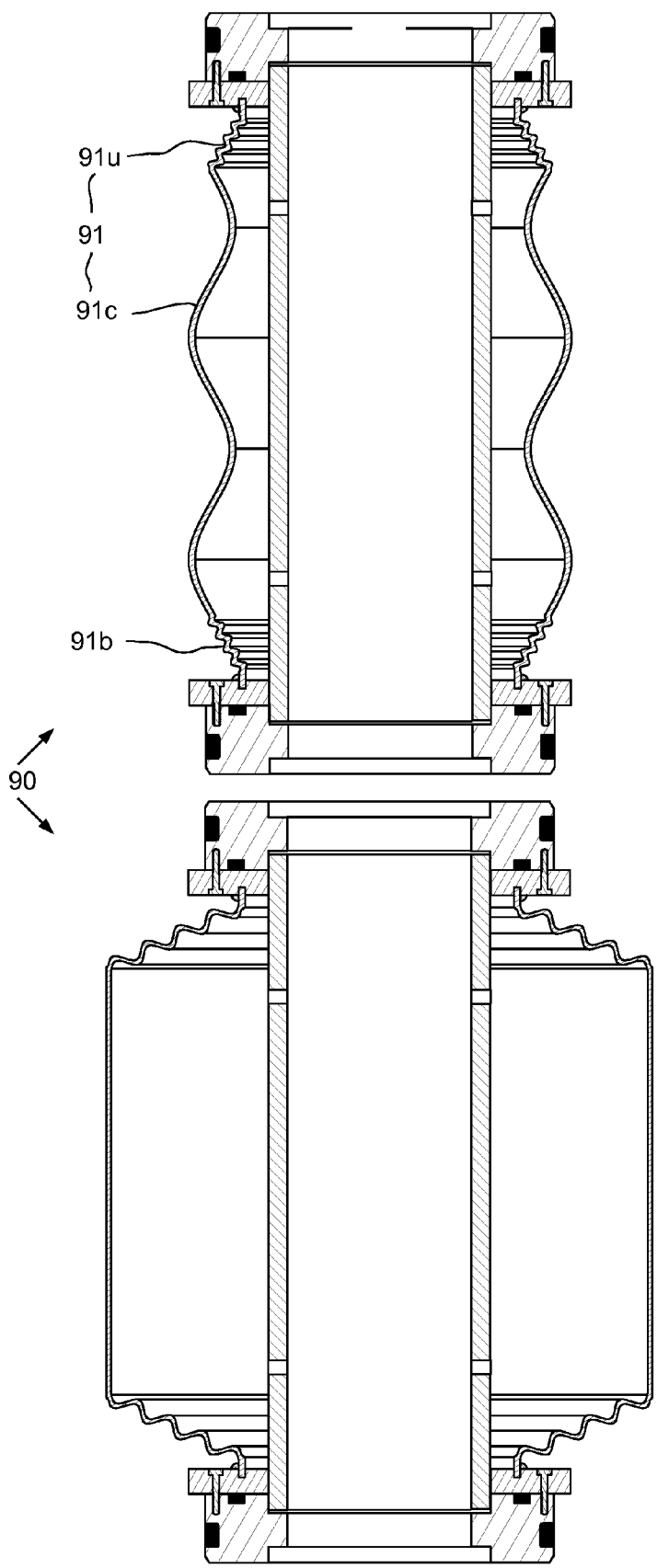
FIG. 9A illustrates another alternative thermal compensator in a contracted position.
FIG. 9B illustrates the thermal compensator in the expanded position.

FIG. 9A illustrates another alternative thermal compensator 90 in a contracted (deployment) position. FIG. 9B illustrates the thermal compensator 90 in the expanded position. First and second thermal compensators 90 (only one shown) may replace the respective compensators 50a,b in the motor seal 22. The thermal compensator 90 may include a metallic bag 91, the guide tube 52, the upper 53u and lower 53b flanges, and the upper 54u and lower 54b adapters. The bag 91 may have the thickness and be made from one of the metal or alloys discussed above for the bag 51. Each bag 91 may have a cylindrical mid-portion 91c and conical end portions 91u,b. To accommodate expansion and contraction of the bag 91, a wall of the bag 91 may form a convoluted (aka bellows) expansion profile there-along. A pitch of the cylindrical portion expansion profile may be greater or substantially greater than a pitch of the end portions expansion profile. Alternatively, the pitches may be the same or the cylindrical portion pitch may be less than the end portions pitch. Alternatively, any of the other expansion profiles may be formed in the cylindrical portion 91c and/or end portions 91u,b.

Alternatively, the thermal compensators 50a,b, 80, 90 may each further include a bag mandrel, each bag 51, 81, 91 may be attached to the respective bag mandrel instead of the flanges 53u,b, and the bag mandrel may be attached to the flanges.

While the foregoing is directed to embodiments of the present disclosure, other and further embodiments of the disclosure may be devised without departing from the basic scope thereof, and the scope of the invention is determined by the claims that follow.

The invention claimed is:

1. A motor seal for a submersible electric motor, comprising:
   a thermal compensator, comprising:
      a guide tube for receiving a shaft of the motor seal, wherein the guide tube has a port formed through a wall thereof;
      a metallic bag disposed around the guide tube and having an expansion profile formed in at least a portion thereof to accommodate radial and circumferential expansion of the metallic bag;
      a pair of flanges attached to opposite ends of the metallic bag; and
      a pair of adapters fastened to the respective flanges and receiving respective ends of the guide tube; and
   a housing having tube sections and bulkhead sections, wherein:
      the thermal compensator is disposed in a compensation chamber formed between adjacent bulkhead sections and divides the chamber into an outer portion and an inner portion,
      an outer surface of the metallic bag is exposed to one of the tube sections, and
      an inner surface of the metallic bag is exposed to the guide tube;
   a thrust bearing having a runner connected to the shaft and a carrier connected to the housing and disposed in a thrust chamber formed between adjacent bulkhead sections, the thrust chamber being in fluid communication with the inner chamber portion; and
   a rotating seal sealing an interface between the shaft and the housing.

2. The motor seal of claim 1, wherein the flanges are attached to the bag by welds.

3. The motor seal of claim 1, wherein a thickness of the bag is less than or equal to six thousandths of an inch.

4. The motor seal of claim 1, wherein the bag has a cylindrical mid-portion and conical end portions.

5. The motor seal of claim 1, further comprising:
   the shaft disposed in the housing, extending along a bore of the housing, and rotatable relative to the housing.

6. The motor seal of claim 4, wherein:
   the expansion profile is a first expansion profile formed in the end portions, and
   the bag has a second expansion profile is formed in the mid-portion.

7. The motor seal of claim 6, wherein:
   the first expansion profile is one of: stepped, convoluted, corrugated, and pleated, and
   the second expansion profile is a different one of: stepped, convoluted, corrugated, and pleated.

8. The motor seal of claim 6, wherein:
   the first expansion profile is one of: stepped, convoluted, corrugated, and pleated, and
   the second expansion profile is the same one.

9. The motor seal of claim 6, wherein the second expansion profile is formed around a circumference of the mid-portion.

10. The motor seal of claim 9, wherein the first expansion profile is formed along a length of the end portions.

11. The motor seal of claim 9, wherein the first expansion profile is formed around a circumference of the end portions.

12. The motor seal of claim 6, wherein:
    the first expansion profile is formed along a length of the end portions, and
    the second expansion profile is formed along a length of the mid portion.

13. The thermal compensator of claim 12, wherein a pitch of the second expansion profile is substantially greater than a pitch of the first expansion profile.

14. The thermal compensator of claim 4, wherein the expansion profile is formed only in the end portions.

15. A method for pumping production fluid from a wellbore, comprising:
    deploying a downhole assembly of an artificial lift system into the wellbore, the downhole assembly comprising an electric motor, a pump, and the motor seal of claim 5 disposed between the motor and the pump; and
    operating the electric motor, thereby driving the pump and lifting production fluid from the wellbore to a surface, wherein:
  operation of the downhole assembly heats motor oil thereof, and
  the metallic bag of the motor seal expands radially and circumferentially or tangentially to accommodate thermal expansion of the motor oil.

* * * * *